United States Patent
Styles et al.

(10) Patent No.: US 7,934,486 B1
(45) Date of Patent: May 3, 2011

(54) INTERNAL AND EXTERNAL LP EGR FOR BOOSTED ENGINES

(75) Inventors: Daniel Joseph Styles, Canton, MI (US); James Leiby, Dryden, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 12/753,716

(22) Filed: Apr. 2, 2010

(51) Int. Cl.
*F02B 37/12* (2006.01)
*F02M 25/07* (2006.01)

(52) U.S. Cl. .............. 123/406.23; 60/611; 123/568.12

(58) Field of Classification Search .......... 123/406.23, 123/561, 559.1, 568.11, 568.12, 568.19, 123/568.18, 568.21; 60/600–603, 611, 612, 60/605.2

See application file for complete search history.

(56) References Cited

U.S. PATENT DOCUMENTS

| | | | |
|---|---|---|---|
| 4,424,675 A * | 1/1984 | Ojima | 60/602 |
| 4,849,897 A * | 7/1989 | Ciccarone | 701/111 |
| 6,062,026 A * | 5/2000 | Woollenweber et al. | 60/605.2 |
| 6,470,682 B2 | 10/2002 | Gray, Jr. | |
| 6,729,301 B2 | 5/2004 | Nakamori et al. | |
| 6,748,936 B2 | 6/2004 | Kinomura et al. | |
| 7,093,590 B2 | 8/2006 | Shimazaki et al. | |
| 2008/0223038 A1 | 9/2008 | Lutz et al. | |
| 2010/0115945 A1 | 5/2010 | Nakatani | |
| 2010/0121557 A1 | 5/2010 | Canino et al. | |

FOREIGN PATENT DOCUMENTS

| | | |
|---|---|---|
| WO | 2007136142 | 11/2007 |
| WO | 2008/152491 A1 | 12/2008 |

* cited by examiner

*Primary Examiner* — Hieu T Vo
(74) *Attorney, Agent, or Firm* — Julia Voutyras; Alleman Hall McCoy Russell & Tuttle LLP (57) ABSTRACT

A method for controlling combustion in a combustion chamber of a turbocharged engine is described. The method includes admitting to the combustion chamber prior to ignition a first amount of exhaust from an intake manifold of the engine, the first amount changing at a first rate in response to a changing engine load. The method also includes retaining in the combustion chamber prior to the ignition a second amount of exhaust from the combustion chamber, the second amount changing at a second rate, greater than the first rate, in response to the changing engine load.

20 Claims, 5 Drawing Sheets

INTERNAL AND EXTERNAL LP EGR FOR BOOSTED ENGINES

TECHNICAL FIELD

This application relates to the field of motor-vehicle engineering, and more particularly, to air induction and exhaust-gas recirculation in motor vehicle engine systems.

BACKGROUND AND SUMMARY

A boosted engine may exhibit higher combustion and exhaust temperatures than a naturally aspirated engine of similar output power. Such higher temperatures may cause increased nitrogen-oxide (NOX) emissions from the engine and may accelerate materials ageing, including turbocharger and exhaust-aftertreatment catalyst ageing. Exhaust-gas recirculation (EGR) is one approach for combating these effects. EGR works by diluting the intake air charge with exhaust gas, thereby reducing its oxygen content. When the resulting air-exhaust mixture is used in place of ordinary air to support combustion in the engine, lower combustion and exhaust temperatures result. EGR can also improve fuel economy in gasoline engines. At medium and high loads, fuel economy is improved due to knock mitigation, allowing for more efficient combustion phasing, reduced heat loss to the engine coolant, and lower exhaust temperatures—which in turn reduce the need for enrichment to cool the exhaust components. At low loads, EGR provides an additional benefit of reducing throttling losses.

In boosted engine systems equipped with a compressor mechanically coupled to an exhaust-driven turbine, exhaust gas may be recirculated through a high pressure (HP) EGR loop and/or a low-pressure (LP) EGR loop. In the HP EGR loop, the exhaust gas is taken from upstream of the turbine and is mixed with intake air downstream of the compressor. In an LP EGR loop, the exhaust gas is taken from downstream of the turbine and is mixed with intake air upstream of the compressor. Further, some engine systems provide so-called 'internal EGR', where combustion in one or more cylinders of the engine may be initiated when exhaust from a previous combustion is still present in the cylinders. The amount of internal EGR may be controlled using variable intake- and/or exhaust-valve timing.

HP and LP EGR strategies achieve optimum efficacy in different regions of the engine load-speed map. Moreover, each strategy presents its own control-system challenges. For example, HP EGR is most effective at low loads, where intake vacuum provides ample flow potential; at higher loads, the desired EGR flow rate may be unattainable due to reduced flow potential. Intrinsically dependent on turbocharger waste gate and throttle conditions, HP EGR may require a complex flow-control strategy. Further, HP EGR may suffer from poor EGR/air-charge mixing and may require a high rate of active cooling due the short length between the HP EGR take-off point and the intake runners of the engine.

In contrast to HP EGR, LP EGR provides adequate flow from mid to high engine loads in areas where HP EGR is flow limited, is more easily cooled, and can be controlled more independently of the throttle and waste gate. However, LP EGR may respond sluggishly to changing engine load, engine speed, or intake air flow. In gasoline engines especially, such unsatisfactory transient response may result in combustion instability during tip-out conditions, when fresh air is needed to sustain combustion but EGR-diluted air is present upstream of the throttle valve. Moreover, a significant lag in EGR availability can occur during tip-in conditions, as the amount of EGR accumulated in the intake manifold may not be sufficient to provide the desired combustion and/or emissions-control performance.

Turbocharged engine systems using more than one EGR mode have been described. For example, World Intellectual Property Organization Patent Application Publication Number 2007/136142 describes a system wherein a ratio of internal and external LP EGR is adjusted depending on engine operating conditions. However, this reference does not contemplate the full range of control options that are possible when fast-responding internal EGR is coordinated with slower-responding external LP EGR.

Therefore, one embodiment provides a method for controlling combustion in a combustion chamber of a turbocharged engine. The method comprises admitting to the combustion chamber prior to ignition a first amount of exhaust from an intake manifold of the engine, the first amount changing at a first rate in response to a changing engine load. The method further comprises retaining in the combustion chamber prior to the ignition a second amount of exhaust from the combustion chamber, the second amount changing at a second rate, greater than the first rate, in response to the changing engine load. In this manner, external LP EGR can be used to supply a suitably dilute intake air charge under a range of steady-state conditions, while faster-responding internal EGR can be used to fill in during transient conditions.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted herein.

DETAILED DESCRIPTION

The subject matter of this disclosure is now described by way of example and with reference to certain illustrated embodiments. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make selected features or relationships easier to see.

Figure 1:
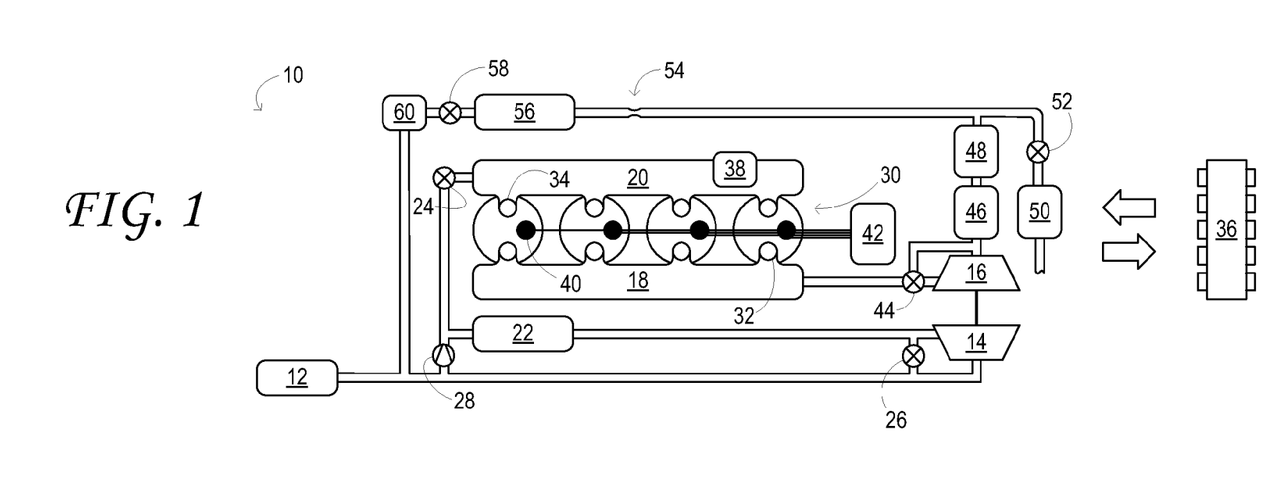
FIGS. 1 and 2 schematically shows aspects of example engine systems in accordance with different embodiments of this disclosure.

FIG. 1 schematically shows aspects of an example engine system 10 in one embodiment. In engine system 10, fresh air is introduced via air cleaner 12 and flows to compressor 14. In embodiments fully consistent with this disclosure, the compressor may be a suitable intake-air compressor—a motor-driven or driveshaft driven supercharger compressor, for example. In engine system 10, however, the compressor is a turbocharger compressor mechanically coupled to turbine 16, the turbine driven by expanding engine exhaust from exhaust manifold 18. In one embodiment, the compressor and turbine may be coupled within a twin scroll turbocharger. In another embodiment, the turbocharger may be a variable geometry turbocharger (VGT), in which turbine geometry is actively varied as a function of engine speed.

In engine system 10, compressor 14 is coupled fluidically to intake manifold 20 via charge-air cooler 22 and throttle valve 24. Accordingly, the pressurized air charge from the compressor flows through the charge-air cooler and throttle valve en route to the intake manifold. The charge-air cooler may be a suitable heat exchanger configured to cool the intake air charge for desired combustion and emissions-control performance. As shown in FIG. 1, compressor by-pass valve 26 is coupled between the inlet and the outlet of the compressor. The compressor by-pass valve may be a normally closed valve configured to open at the command of an electronic control system (vide infra) in order to relieve excess boost pressure under selected operating conditions. For example, the compressor by-pass valve may be opened during conditions of decreasing engine speed to avert compressor surge. When the compressor by-pass valve is opened, uncompressed, fresh air may flow to throttle valve 24 through check valve 28, or compressed air may leak around the compressor to the upstream side. Moreover, check valve 28 enables fresh air bypass of most of the EGR-diluted air charge upstream of the throttle valve. This feature may reduce the impact of residual EGR-diluted air in the engine system during tip out.

In engine system 10, exhaust manifold 18 and intake manifold 20 are coupled to a series of combustion chambers 30 through a series of exhaust valves 32 and intake valves 34, respectively. In one embodiment, each of the exhaust and intake valves may be electronically actuated. In another embodiment, each of the exhaust and intake valves may be cam actuated. Whether electronically actuated or cam actuated, the timing of exhaust and intake valve opening and closure may be adjusted as needed for desired combustion and emissions-control performance. In particular, the valve timing may be adjusted so that combustion is initiated when a controlled amount of exhaust from a previous combustion is still present in one or more combustion chambers. Such exhaust gas may be retained in the combustion chamber (e.g., not expelled, or not fully expelled, from the combustion chamber during the exhaust stroke), or in the alternative, readmitted to the combustion chamber from the exhaust manifold during the intake stroke via a still open exhaust valve. In this manner, the adjusted valve timing may enable an 'internal EGR' mode useful for reducing peak combustion temperatures under selected operating conditions. For example, as the closing timing of the exhaust valve is moved away from TDC of the exhaust stroke, increased amounts of exhaust gas may be retained, depending on parameters such as engine speed, engine load, etc. Specifically, early exhaust valve closing (before TDC of the exhaust stroke) may be used to limit the expulsion of exhaust gasses and increase residual exhaust gasses retained for the next combustion event in the particular cylinder. In another example, late exhaust valve closing (e.g., closing of the exhaust valve during the intake stroke of a subsequent cylinder cycle) may increase exhaust gases drawn in from the exhaust manifold to the cylinder during the intake stroke, again increasing internal EGR. In this way, valve adjustments can affect the amount of EGR in the very next combustion event in that cylinder. In some embodiments, adjusted valve timing may be used in addition to the 'external EGR' modes described hereinafter. Via a suitable combination or coordination of internal and external EGR modes, the engine system may be configured to recirculate exhaust back to combustion chambers 30 under selected operating conditions.

FIG. 1 shows electronic control system 36, which may be an electronic control system of the vehicle in which engine system 10 is installed. In embodiments where at least one intake or exhaust valve is configured to open and close according to an adjustable timing, the adjustable timing may be controlled via the electronic control system to regulate an amount of exhaust present in a combustion chamber at a time of ignition. To assess operating conditions in connection with the control functions of the engine system, the electronic control system may be operatively coupled to a plurality of sensors arranged throughout the engine system—flow sensors, temperature sensors, pedal-position sensors, pressure sensors, etc. In FIG. 1, for example, manifold air pressure sensor 38 is shown coupled to intake manifold 20. Various other sensors may be provided as well, in this and other embodiments.

Combustion chambers 30 may be supplied one or more of a variety of fuels: gasoline, alcohols, diesel, biodiesel, compressed natural gas, etc. Fuel may be supplied to the combustion chambers via direct injection, port injection, throttle-body injection, or any combination thereof. In engine system 10, combustion is initiated via spark ignition. Accordingly, the engine system includes a series of spark plugs 40 configured to receive timed voltage pulses from electronic ignition system 42. In other embodiments, combustion may be initiated via spark ignition and/or compression ignition in any variant.

As noted above, exhaust from exhaust manifold 18 flows to turbine 16 to drive the turbine. When reduced turbine torque is desired, some exhaust may be directed instead through waste gate 44, by-passing the turbine. The combined flow from the turbine and the waste gate then flows through exhaust-aftertreatment devices 46 and 48. The nature, number, and arrangement of the exhaust-aftertreatment devices may differ in the different embodiments of this disclosure. In general, the exhaust-aftertreatment devices may include at least one exhaust-aftertreatment catalyst configured to catalytically treat the exhaust flow, and thereby reduce an amount of one or more substances in the exhaust flow. For example, one exhaust-aftertreatment catalyst may be configured to trap NOX from the exhaust flow when the exhaust flow is lean, and to reduce the trapped NOX when the exhaust flow is rich. In other examples, an exhaust-aftertreatment catalyst may be configured to disproportionate NOX or to selectively reduce NOX with the aid of a reducing agent. In still other examples, an exhaust-aftertreatment catalyst may be configured to oxidize residual hydrocarbons and/or carbon monoxide in the exhaust flow. Different exhaust-aftertreatment catalysts having any such functionality may be arranged in wash coats or elsewhere in the exhaust-aftertreatment devices, either separately or together. In some embodiments, the exhaust-aftertreatment devices may include a regenerable soot filter configured to trap and oxidize soot particles in the exhaust flow.

Continuing in FIG. 1, all or part of the treated exhaust from the exhaust aftertreatment devices may be released into the ambient via silencer 50. In engine system 10, the treated exhaust flows to the silencer via exhaust back-pressure valve 52. The exhaust back-pressure valve may be kept fully open under normal operating conditions, but commanded to partially close at low engine loads, as further described hereinafter.

Depending on operating conditions, some treated exhaust may be diverted through flow-restricting EGR orifice 54 and EGR cooler 56. The exhaust may be diverted by opening an EGR shut-off valve 58 coupled in series with the EGR cooler, for example. The EGR cooler may be a suitable heat exchanger configured to cool the exhaust flow to temperatures suitable for mixing into the intake air charge. In this manner, some exhaust may be delivered to the intake manifold via a cooled conduit coupled downstream of the turbine and upstream of the compressor. From EGR cooler 56, the cooled exhaust gas flows to EGR shut-off valve 58; from the EGR shut-off valve, it flows through EGR flow sensor 60 en route to compressor 14. The rotation of the compressor, in addition to the relatively long LP EGR flow path in engine system 10, provides excellent homogenization of the exhaust gas into the intake air charge. Further, the disposition of EGR take-off and mixing points provides very effective cooling of the exhaust gas; as shown in FIG. 1, the recirculated exhaust traverses exhaust-aftertreatment devices 46 and 48, EGR cooler 56, as well as charge-air cooler 22.

In some embodiments, throttle valve 24, compressor by-pass valve 26, waste gate 44, exhaust back-pressure valve 52, and/or EGR shut-off valve 58 may be electronically controlled valves configured to close and open at the command of electronic control system 36. Further, one or more of these valves may be continuously adjustable. The electronic control system may be operatively coupled to each of the electronically controlled valves and configured to command their opening, closure, and/or adjustment as needed to enact any of the control functions described herein. To monitor the external EGR flow and enable additional control based on the external EGR flow, engine system 10 includes EGR flow sensor 60. The EGR flow sensor may be operatively coupled to the electronic control system and configured to provide an output responsive to the external EGR flow. In one embodiment, the electronic control system may be configured to adjust the EGR shut-off valve at a first, lower rate and the variable valve timing (vide supra) at a second, higher rate to provide a desired exhaust-gas recirculation rate to the combustion chamber prior to the ignition. The first and second rates may differ in this manner because of the naturally lower response bandwidth for changes in LP EGR flow rate relative to the internal EGR rate. The lower response bandwidth is due to the comparatively great amount of exhaust residing between the LP EGR take-off point and the LP EGR injection point during typical operating conditions.

In one embodiment, EGR shut-off valve 58 may not be a continuously adjustable valve, but a simpler, two-state shut-off valve. Specifically, the EGR shut-off valve may admit of two states—a more open state and less open state. The less open state of the EGR shut-off valve may be substantially closed but configured to leak a low flow of EGR under strong pressurization. The more open state of the EGR shut-off valve may be configured to provide relatively little flow restriction, such that the external EGR flow responds naturally to changing flow potential from the EGR take-off point to the EGR mixing point. For ease of description, the more open state is referred to hereinafter as 'open', and the less open state is referred to hereinafter as 'closed'; these terms will be understood in the non-limiting context defined above.

By appropriately controlling EGR shut-off valve 58, and by adjusting the exhaust and/or intake valve timing, electronic control system 36 may enable engine system 10 to deliver intake air to combustion chambers 30 under varying operating conditions. These include conditions where EGR is omitted from the intake air or is provided internal to each combustion chamber (via adjusted valve timing, for example), conditions where EGR is drawn from an LP take-off point downstream of turbine 16 and provided to an LP mixing point upstream of compressor 14, and conditions where both of these strategies are applied in concert.

Accordingly, when EGR shut-off valve 58 is open, EGR will flow during conditions of medium and high engine load in response to the pressure gradient between take-off and mixing points. The desired EGR flow during these conditions may be set or at least bracketed due to the flow restriction of EGR orifice 54. As the engine load increases and internal EGR is phased out, the pressure gradient between these points increases also, naturally driving the external EGR flow. As the engine load decreases, the pressure gradient also decreases, so the external EGR flow is naturally reduced as internal EGR is phased in. At very low engine loads approaching idle, the EGR shut-off valve may be closed to discourage external EGR flow. The EGR shut-off valve may be closed also during peak-power operation. However, by providing a small leak in the valve, a small flow of external EGR can be delivered at peak power, driven by the large pressure gradient across the valve. Such external EGR flow may advantageously reduce enrichment and maintain peak power requirements. Thus, the combination of EGR orifice 54 with a simple shut-off valve enables the external EGR flow to be controlled in a manner that naturally tracks engine load in low-to-high load regions. By inference, such a control strategy may provide optimal fuel economy in some embodiments. This simple configuration also eliminates much of the control complexity required to actuate a fully proportional EGR valve.

Further, exhaust-back pressure valve 52 may be partially closed to maintain adequate flow potential in the external EGR loop. When the exhaust back-pressure valve is partially closed, exhaust pressure builds at the LP EGR take-off point, thereby increasing the external EGR flow potential. Partially closing the exhaust back-pressure valve may also increase the internal EGR rate.

Figure 2:
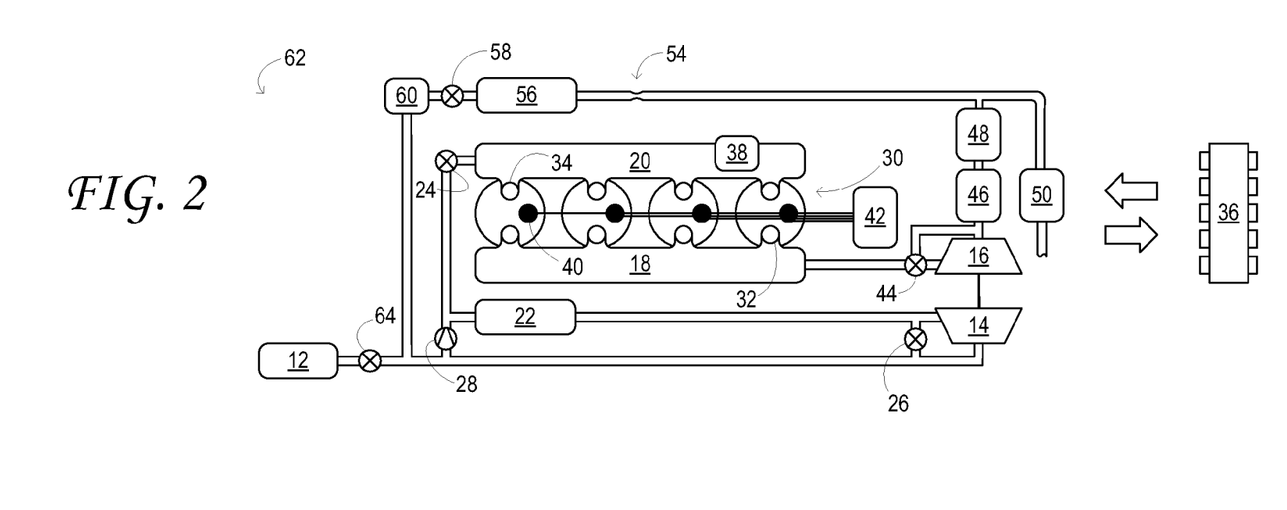

FIG. 2 schematically shows aspects of another example engine system 62 in one embodiment. Engine system 62 lacks exhaust backpressure valve 52, but includes clean-air throttle valve 64 coupled downstream of air cleaner 12. The clean-air throttle valve may be an electronically controlled valve operatively coupled to electronic control system 36. The clean-air throttle valve may be kept fully open under normal operating conditions, but partially closed at low engine loads to maintain adequate flow potential in the external EGR loop. When the clean-air throttle valve is partially closed, a partial vacuum develops downstream of the clean-air throttle valve, thereby increasing the external EGR flow potential.

In other embodiments fully consistent with this disclosure, the engine system may include both an exhaust back-pressure valve and a clean-air throttle valve. In still other embodiments, the engine system may include neither.

Figure 3:
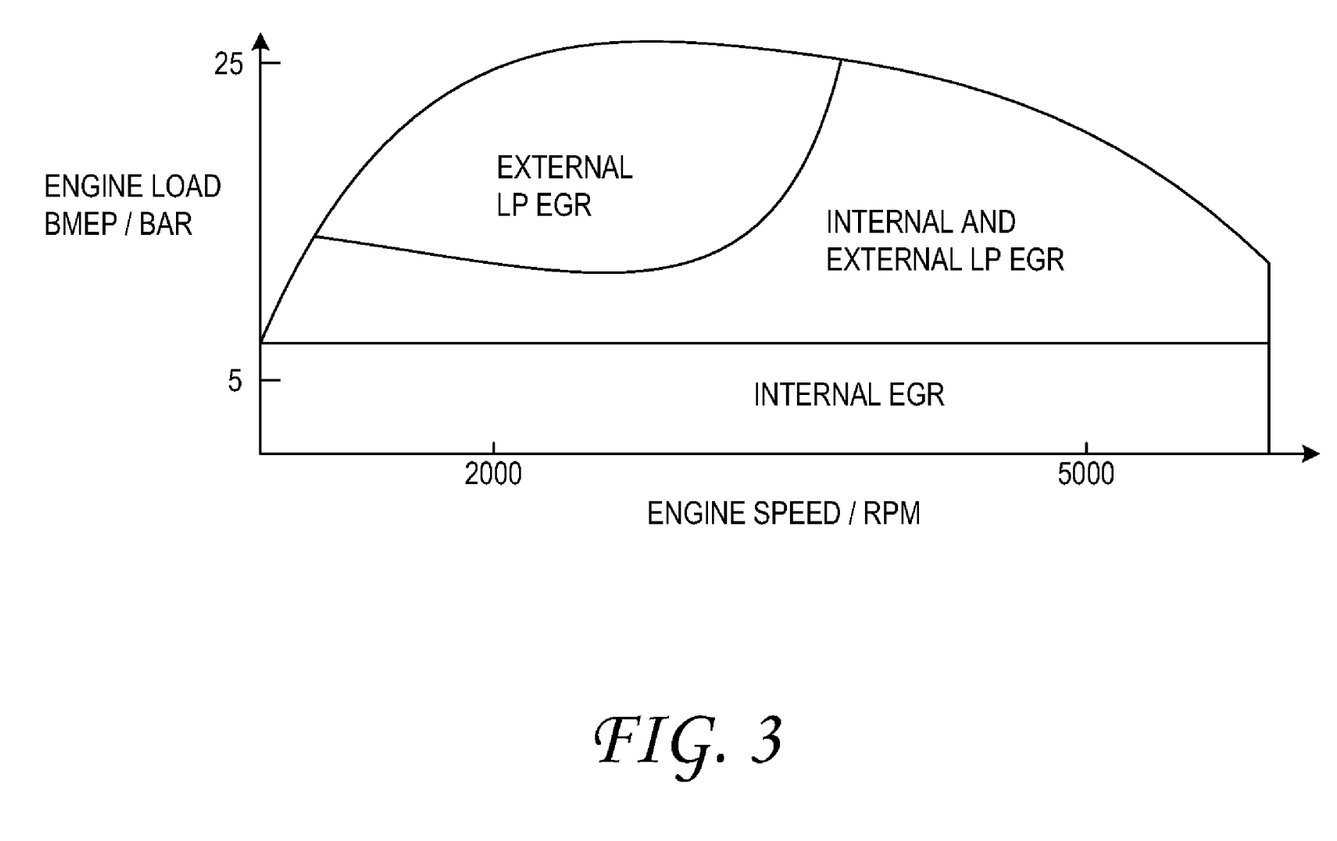
FIG. 3 shows an idealized map of engine load versus engine speed for an example turbocharged engine in accordance with an embodiment of this disclosure.

FIG. 3 shows an idealized map of engine load versus engine speed for an example turbocharged gasoline engine in one embodiment. The map is divided into three regions based on how EGR is supplied to the combustion chambers of the engine: a low-load region where internal EGR but no external EGR is supplied, a mid-load region where a controlled mixture of internal and external EGR is supplied, and a high-load region where external LP EGR but no internal EGR is supplied. Hereinafter, various control features for governing EGR supply according to such a map are described by example. It will be understood, however, that the control features here described are equally compatible with other engine maps, including those in which the external EGR includes some amount of HP EGR—viz., EGR drawn from an HP take-off point upstream of a turbine and delivered to an HP injection point downstream of a compressor. In such embodiments, the mid-load region illustrated in FIG. 3 may include a low-speed region and a high-speed region. In the low-speed region, a controlled mixture of internal and external HP EGR may be supplied. And in the high-speed region, external HP EGR but no internal EGR may be supplied. In still other embodiments, the high-load region where external LP EGR but no internal EGR is supplied may be omitted.

The configurations described above enable various methods for controlling combustion in a combustion chamber of a turbocharged engine. Accordingly, some such methods are now described, by way of example, with continued reference to above configurations. It will be understood, however, that the methods here described, and others fully within the scope of this disclosure, may be enabled via other configurations as well. The methods presented herein include various measuring and/or sensing events enacted via one or more sensors disposed in the engine system. The methods also include various computation, comparison, and decision-making events, which may be enacted in an electronic control system operatively coupled to the sensors. The methods further include various hardware-actuating events, which the electronic control system may command in response to the decision-making events.

Figure 4:
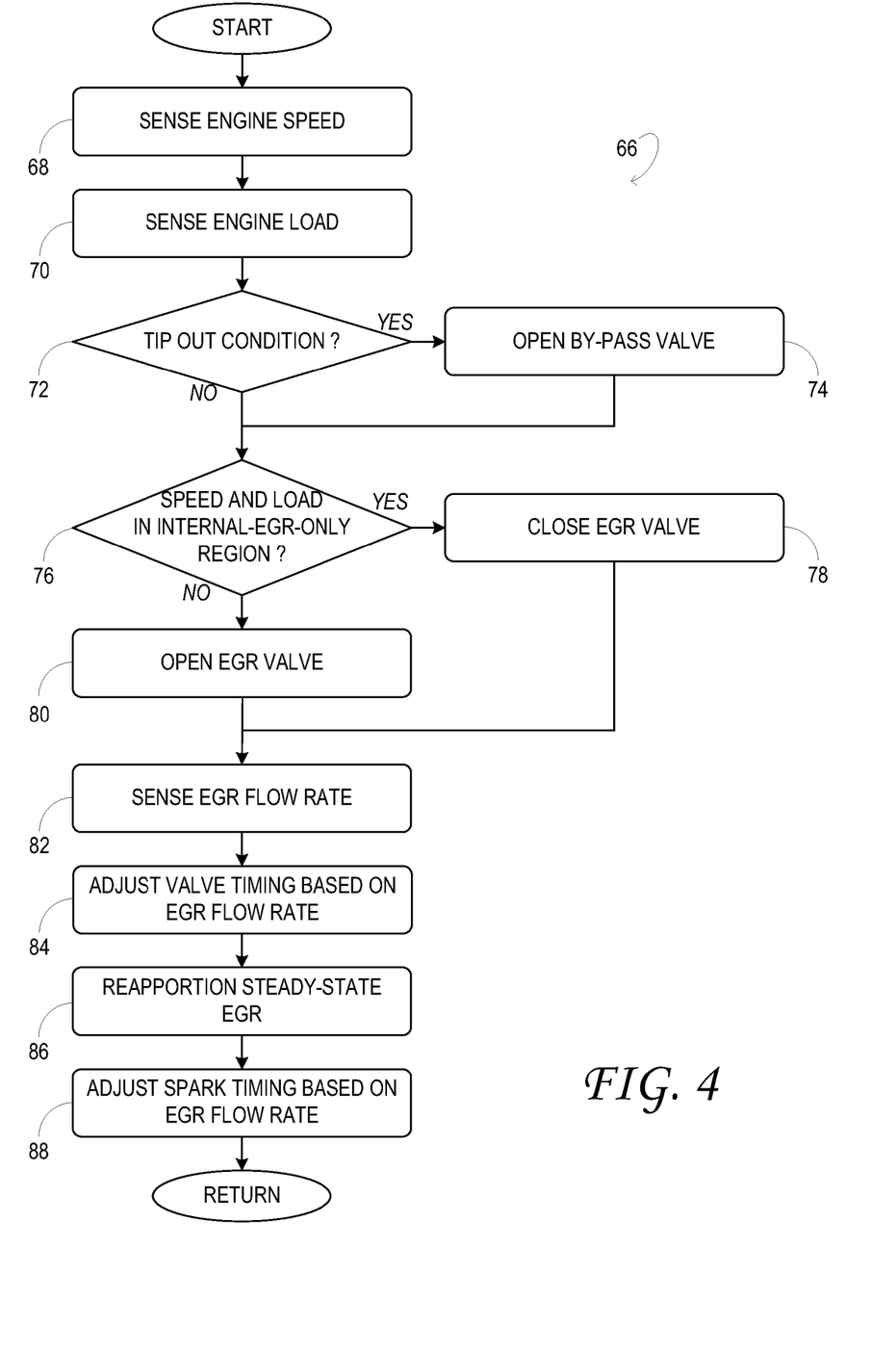
FIG. 4 illustrates an example method for controlling combustion in a combustion chamber of a turbocharged engine in accordance with an embodiment of this disclosure.

FIG. 4 illustrates an example method 66 for controlling combustion in a combustion chamber of a turbocharged engine in one embodiment. The method may be entered upon while the engine system is running.

Method 66 begins at 68, where the engine speed is sensed. The engine speed may be sensed directly or indirectly, by interrogating a sensor responsive to engine speed, for example. Such sensors may include an engine-rotation sensor, a mass air flow sensor, etc. The method then advances to 70, where the engine load is sensed. The engine load may be sensed directly or indirectly, by interrogating a sensor responsive to engine load—a manifold air-pressure sensor, for example.

Based on monitoring the engine speed and engine load, the electronic control system at 72 determines whether tip out has occurred recently. If tip out has occurred, then at 74, a compressor by-pass valve coupled across the intake air compressor is opened, thereby relieving excess boost pressure and discharging most of the accumulated EGR stored upstream of the throttle valve. After this action, or if no tip out was detected, method 66 advances to 76, where it is determined whether the sensed engine speed and engine load correspond to a region of the idealized engine map (e.g., FIG. 3) where internal EGR only is to be provided to the combustion chambers of the engine. If the sensed engine speed and engine load do correspond to such a condition, then the method advances to 78, where an EGR shut-off valve supplying external EGR is closed. Otherwise, the method advances to 80, where the EGR shut-off valve is opened. In one embodiment, an appropriate EGR mode may be selected based on the operating point of the engine by comparing the engine speed and/or engine load to one or more thresholds. For example, external EGR only can be used when the engine load is above a first, higher engine-load threshold, and internal EGR only can be used when the engine speed is below a second, lower engine-load threshold.

Accordingly, at 80 a first amount of exhaust is admitted to the combustion chambers from the intake manifold of the engine prior to ignition. Supplied via external LP EGR, the first amount may be changed (increased or decreased) from one combustion cycle to a next or subsequent combustion cycle in response to changing engine load. The changeability may derive from at least two mechanisms. First, the flow potential in the LP EGR loop will increase with increasing engine load and decrease with decreasing engine load. Therefore, even when the extent of opening of the EGR shut-off valve remains the same, this first amount of exhaust will change as a function of engine load. Second, the decision whether or not to open the EGR shut-off valve is made, at 76, dynamically, and in response to a changing engine load.

Notwithstanding, the rate at which the first amount of exhaust can be changed may be limited by the significant volume of the LP EGR flow path, as noted hereinabove. Thus, the first amount may change at a limited first rate in response to changing engine load.

Continuing in FIG. 4, method 66 advances from 80 to 82, where the external EGR flow is sensed. The external EGR flow may be sensed by interrogating an EGR flow sensor coupled within an EGR conduit in the engine system. The method then advances to 84, where an intake and/or exhaust valve timing is adjusted based on the sensed external EGR flow. In one embodiment, such adjustment may comprise actuating a variable cam timing mechanism of the engine. In this manner, a second amount of exhaust, from the combustion chamber, may be retained in the combustion chamber prior to the ignition. Like the first amount referenced above, the second amount may be increased as the engine load increases and decreased as the engine load decreases. When the EGR shut-off valve is closed, the valve timing may be adjusted in order to provide all of the desired EGR to the combustion chambers of the engine. When the EGR shut-off valve is open, the valve timing may be adjusted in order to provide a supplementary second amount of internal EGR in addition to the first amount supplied externally, so that the total amount of EGR (external plus internal, first plus second) approaches the target amount. Thus, the second amount may be changed (increased or decreased) in response to the changing first amount. Inasmuch as the first amount changes in response to changing engine load, the second amount will also change in response to changing engine load. In general, the variable valve timing mechanism that enables internal EGR may succeed in changing the second amount of exhaust retained in the combustion chamber more rapidly than adjusting the EGR shut-off valve will succeed in changing the first amount of exhaust admitted to the combustion chamber. Thus, the second amount may change at a second rate, greater than the first rate, in response to the changing engine load.

Method 66 then advances to 86, where the steady-state EGR flow (if any) is reapportioned between internal and external EGR. In particular, steady-state EGR reapportioning may adjust the relative amounts of internal and external EGR supplied to the combustion chambers of the engine at steady state to enable faster response to subsequent transient conditions, as further described below with reference to FIG. 5. Following 86, the method advances to 88, where the spark timing of the engine is adjusted based on engine speed, engine load, and EGR rate. In one embodiment, a given amount of spark advance may be applied under conditions where external EGR adequate for current speed and load conditions is available. When adequate external EGR is not available, however, the spark advance may be reduced or delayed. External EGR may be unavailable due to transport lag time at start-up or tip in, for example. In this manner, the spark timing may be adjusted in response to the first amount of exhaust. However, because external EGR will be used over the entire engine map, conditions during which such measures are needed may be reduced.

Figure 5:
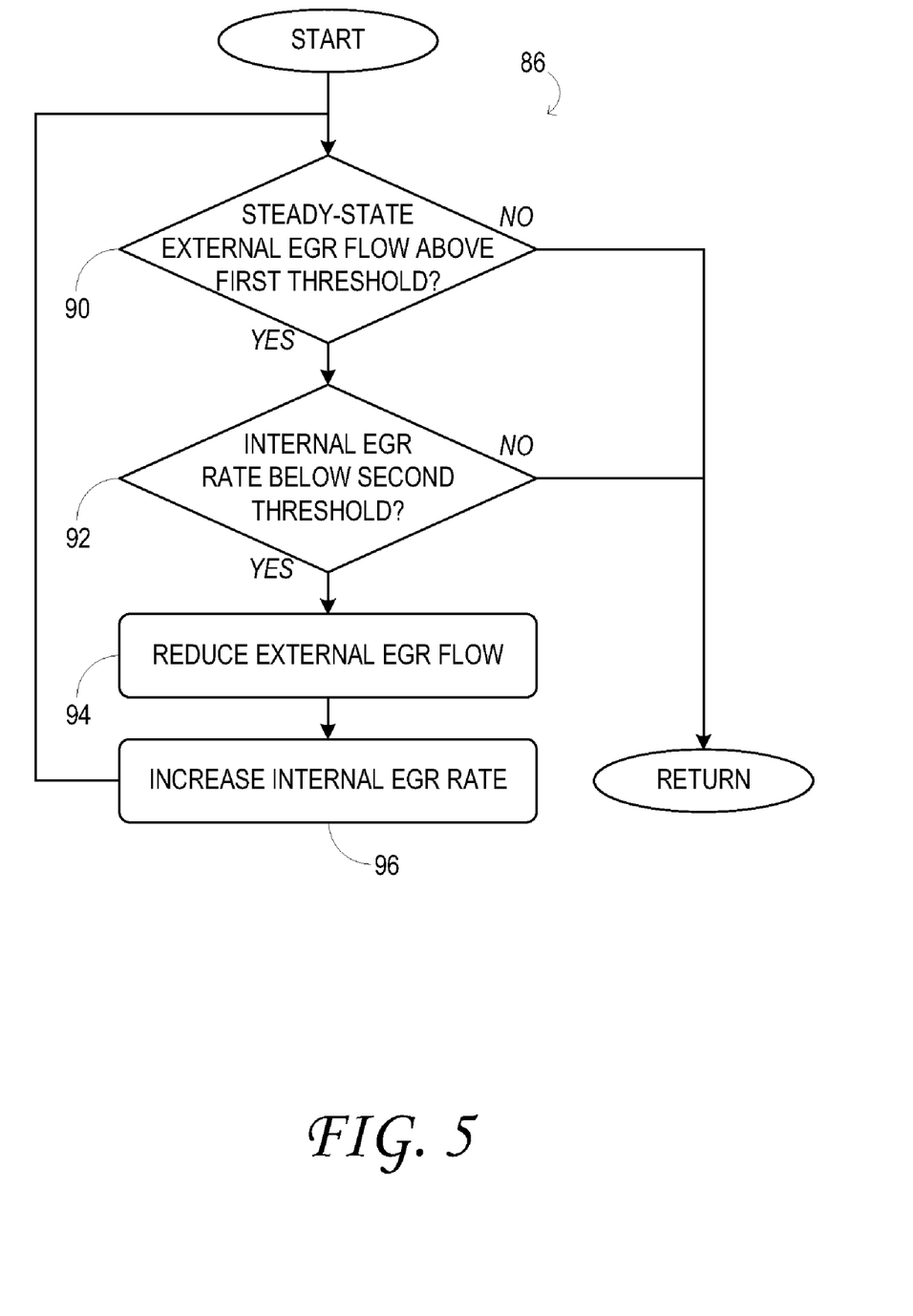
FIG. 5 illustrates an example method for reapportioning the relative amounts of internal and external EGR during steady-state engine-load conditions in accordance with an embodiment of this disclosure.

FIG. 5 illustrates an example method 86 for reapportioning the relative amounts of internal and external EGR during steady-state engine-load conditions. When this method is executed, the first amount of exhaust is reduced and the second amount of exhaust is increased, both at a third rate, less than or equal to the first rate referenced above. In this manner, the total amount of exhaust retained in and admitted to the combustion chamber may be substantially unchanged. This action increases a range of authority of the second amount over a combustion temperature in the combustion chamber, providing flexibility for handling subsequent transient engine conditions. Method 86 may be entered upon during execution of above method 66, as a particular example of step 86, for example.

Method 86 begins at 90, where it is determined whether a steady-state EGR flow in the engine system is above a first threshold. In this context, the term 'steady-state' EGR flow will be understood to mean an EGR flow that is not changing or is changing at a relatively low rate, is characterized by a relatively long time constant, etc. At steady-state, the EGR flow has caught up with, and is providing the target amount of EGR for current operating conditions of the engine.

Figure 6:
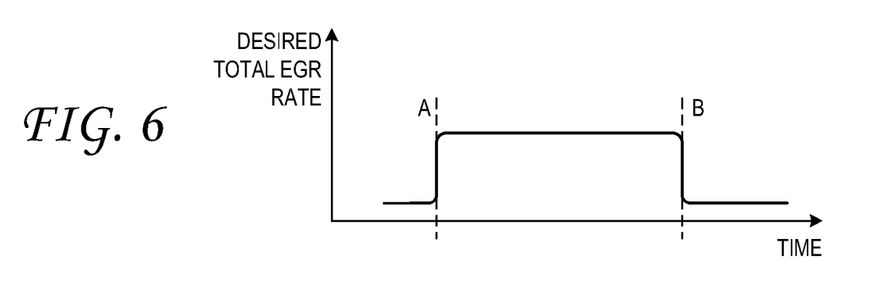
FIG. 6 shows an idealized graph of desired total EGR rate versus time in an example scenario in accordance with an embodiment of this disclosure.
Figure 7:
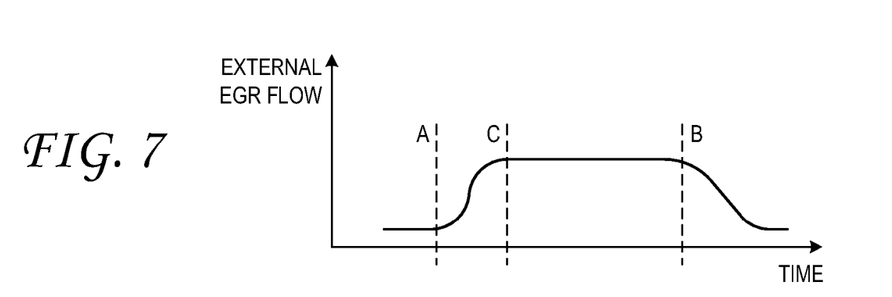
FIGS. 7 and 8 show idealized graphs of external EGR flow rate versus time in an example scenarios in accordance with an embodiment of this disclosure.

The hypothetical graphs shown FIGS. 5 and 6 illustrate the above distinction. FIG. 6 shows desired total EGR rate plotted versus time. The graph extends through event A, which may comprise a throttle opening, and event B, which may comprise a throttle closure. FIG. 7 shows a possible response in external EGR flow through the same events A and B. In particular, FIG. 7 shows a transport lag from A to C, where the available external EGR flow does not provide the desired total EGR rate. FIG. 7 also shows that the cut out of the external EGR flow at B may not occur as promptly as desired because a significant amount of EGR may be trapped upstream of the throttle valve and may take a significant amount of time to diffuse out of the engine system. In FIG. 7, the time domain from A to C and the time domain subsequent to B are those in which the external EGR flow is transient; the time domain from C to B is one in which the external EGR flow is at steady state.

Returning now to FIG. 4, in one embodiment, it may be determined at 90 whether the external EGR flow conforms to steady-state conditions, and if so, whether the steady-state external EGR flow is above a first threshold. If it is determined that the steady-state EGR flow is above the first threshold, then method 86 advances to 92, where it is determined whether the internal EGR rate is below a second threshold. Otherwise, the method returns. If it is determined that the internal EGR rate is below the second threshold, then the method advances to 94, where the external EGR flow is gradually reduced while steady-state conditions are maintained, and to 96, where the internal EGR rate is gradually increased to compensate. Otherwise, the method returns. Steps 94 and 96 may be executed substantially concurrently or in any suitable manner to effect compensation of the decreasing external EGR flow by the increasing internal EGR rate, so that the total EGR rate remains at the desired level, suitable for engine load and speed conditions. Following 96, method 86 returns to 90.

In the example method illustrated in FIG. 5, the relative amounts of internal and external EGR are reapportioned when the external EGR flow rate is above a first threshold and when the internal EGR rate is below a second threshold. In one embodiment, such conditions correspond to an intermediate engine load region, when the engine load is between first and second engine-load thresholds, such as the engine-load thresholds referenced above in the context of method 66. Thus, when the engine load is between the first and second thresholds, the first amount may be reduced and the second amount may be increased, both at a third rate, less than or equal to the first rate, during steady-state engine-load conditions.

Figure 8:
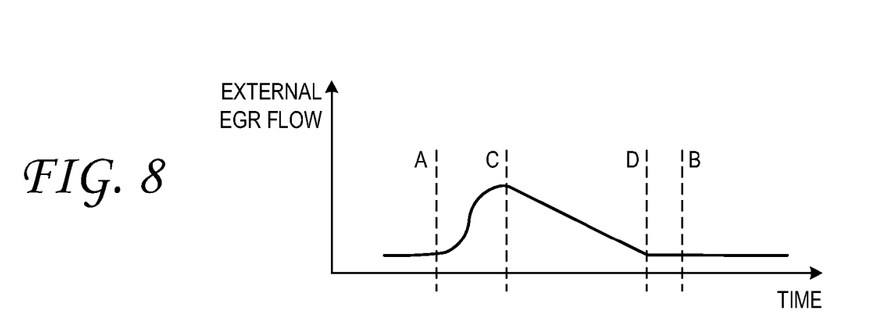
Figure 9:
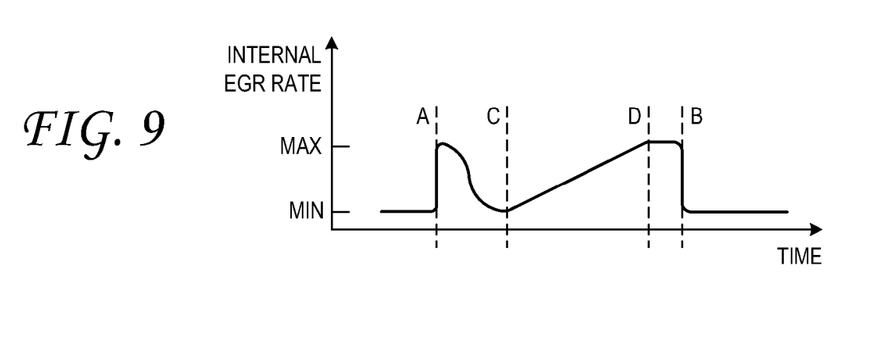
FIG. 9 shows an idealized graph of internal EGR rate versus time in an example scenario in accordance with an embodiment of this disclosure.

The graphs of FIGS. 7 and 8 illustrate the reapportioning of external and internal EGR in one example scenario. FIG. 8 shows the external EGR flow plotted versus time. In the steady state domain from C to B, the external EGR flow is decreased gradually from C to D and then held steady from D to B. In one embodiment, the interval from C to B may be varied by the electronic control system to provide stable and flexible EGR control. For example, the interval from C to B may be the shortest interval in which the external EGR flow can be reduced to the desired level whilst maintaining steady-state conditions. In one embodiment, the D may be chosen based on such factors as steady-state engine speed. For example, the duration from C to D may be shortened with increasing engine speed and lengthened with decreasing engine speed. FIG. 9 shows the internal EGR rate plotted versus time. In the steady-state domain from C to B, the internal EGR rate is increased gradually from C to D, held steady from D to B, and then decreased abruptly as needed to match the desired total EGR rate (FIG. 6).

In the example graph of FIG. 9, the internal EGR rate descends to a minimum level at C and ascends to a maximum level at D. Thus, the internal EGR rate may be commanded to vary over its full operating range. In this manner, the internal EGR rate may exert its maximum possible range of authority over the peak combustion temperature and other operating conditions that depend on the total EGR amount. Accordingly, the ability of the engine system to respond to load transients is maximized. Notwithstanding, it will be understood that in some embodiments fully consistent with this disclosure, the internal EGR rate may vary over less than its full operating range.

The methods above show that the relative amounts of internal EGR and external LP EGR may be reapportioned during steady state conditions to increase the range of authority of the faster-acting internal EGR. In this manner, the combined EGR amount can be made more responsive to transient conditions. It will be further appreciated that the relative amounts of internal and external, cooled LP EGR are tunable under other operating conditions as well, including transient conditions. Thus, the relative amounts may be adjusted based on stability requirements during tip out and further based on cooling requirements at higher loads. Although such functionality is applied herein to a turbocharged engine system configured for cooled LP EGR, analogous strategies are contemplated for systems configured for HP EGR or for combinations of HP and LP EGR.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, this disclosure includes all novel and non-obvious combinations and sub-combinations of the various systems and methods disclosed herein, as well as any and all equivalents thereof.

The invention claimed is:

1. A system for controlling combustion in a combustion chamber of a turbocharged engine, the system comprising:
    a compressor coupled fluidically to an intake manifold of the engine via a throttle valve;
    a turbine mechanically coupled to the compressor and driven by expanding engine exhaust from an exhaust manifold of the engine;
    a cooled conduit coupled downstream of the turbine and upstream of the compressor and configured to deliver exhaust to the intake manifold;
    a shut-off valve coupled in the cooled conduit;
    an intake valve coupling the intake manifold to the combustion chamber and an exhaust valve coupling the exhaust manifold to the combustion chamber, at least one of the intake valve and the exhaust valve configured for variable valve timing; and
    an electronic control system configured to adjust the shut-off valve at a first, lower rate and the variable valve timing at a second, higher rate to provide a desired exhaust-gas recirculation rate to the combustion chamber prior to the ignition.

2. The system of claim 1, further comprising a flow-restricting orifice coupled in the cooled conduit.

3. The system of claim 1, wherein the shut-off valve is a two-state valve having a more open state and a less open state, and wherein the shut-off valve is configured to leak under a strong enough pressure differential in the less open state.

4. The system of claim 1, wherein the desired exhaust-gas recirculation rate increases with increasing engine load and decreases with decreasing engine load.

5. A method for controlling combustion in a combustion chamber of a turbocharged engine, the method comprising:
    admitting to the combustion chamber prior to ignition a first amount of exhaust from an intake manifold of the engine, the first amount changing at a first rate in response to a changing engine load; and
    retaining in the combustion chamber prior to the ignition a second amount of exhaust from the combustion chamber, the second amount changing at a second rate, greater than the first rate, in response to the changing engine load.

6. The method of claim 5, further comprising reducing the first amount and increasing the second amount at a third rate, less than or equal to the first rate, during steady-state engine-load conditions.

7. The method of claim 6, wherein reducing the first amount and increasing the second amount leaves a total amount of exhaust retained in and admitted to the combustion chamber substantially unchanged.

8. The method of claim 6, wherein reducing the first amount and increasing the second amount increases a range of authority of the second amount over a combustion temperature in the combustion chamber.

9. The method of claim 5, wherein changing at the first rate and changing at the second rate comprise increasing as the engine load increases and decreasing as the engine load decreases.

10. The method of claim 5, further comprising flowing exhaust en route to the intake manifold through an open valve, wherein an extent of opening of the open valve remains the same as the first amount is changed.

11. The method of claim 5, further comprising adjusting the second amount in response to the first amount.

12. The method of claim 11, wherein the second amount corresponds to a difference between a target total amount of exhaust to be retained in and admitted to the combustion chamber minus the first amount.

13. The method of claim 11, further comprising adjusting a spark timing in response to the first amount.

14. The method of claim 5, wherein admitting the second amount comprises adjusting one or more of an intake valve timing and an exhaust valve timing in response to the changing engine load.

15. The method of claim 14, wherein said adjusting comprises actuating a variable cam timing mechanism of the engine.

16. A method for controlling combustion in a combustion chamber of a turbocharged engine, the method comprising:
    when the engine load is above a first threshold, admitting to the combustion chamber prior to ignition a first amount of exhaust from an intake manifold of the engine, the first amount changing at a first rate in response to a changing engine load;
    when the engine load is below a second threshold, retaining in the combustion chamber prior to the ignition a second amount of exhaust from the combustion chamber, the second amount changing at a second rate, greater than the first rate, in response to the changing engine load; and
    when the engine load is between the first and second thresholds, reducing the first amount and increasing the second amount at a third rate, less than or equal to the first rate, during steady-state engine-load conditions.

17. The method of claim 16, wherein reducing the first amount and increasing the second amount leaves a total amount of exhaust retained in and admitted to the combustion chamber substantially unchanged and increases a range of authority of the second amount over a combustion temperature in the combustion chamber.

18. The method of claim 16, wherein changing at the first rate and changing at the second rate comprise increasing as the engine load increases and decreasing as the engine load decreases.

19. The method of claim 16, further comprising adjusting the second amount in response to the first amount.

20. The method of claim 19, wherein adjusting the second amount in response to the first amount comprises increasing the second amount when the first amount decreases and decreasing the second amount when the first amount increases.

* * * * *